(12) United States Patent
Wang

(10) Patent No.: US 6,702,396 B1
(45) Date of Patent: Mar. 9, 2004

(54) WHEEL COVER HAVING ROTATING WING PLATE

(75) Inventor: Ming-Fang Wang, Tainan Hsien (TW)

(73) Assignee: Kuan Hsings Enterprise Corp. (TW)

( * ) Notice: Subject to any disclaimer, the term of this patent is extended or adjusted under 35 U.S.C. 154(b) by 0 days.

(21) Appl. No.: 10/350,029

(22) Filed: Jan. 24, 2003

(51) Int. Cl.$^7$ .............................. B60B 7/04; B60B 7/00
(52) U.S. Cl. .............................. 301/37.25; 301/37.108
(58) Field of Search .......................... 301/37.25, 37.26, 301/37.32, 37.33, 37.101, 37.108; 40/587

(56) References Cited

U.S. PATENT DOCUMENTS

| | | | | |
|---|---|---|---|---|
| 2,762,469 A | * | 9/1956 | Lyon | 301/37.25 |
| 2,997,344 A | * | 8/1961 | Whiteman | 301/37.25 |
| 3,219,391 A | * | 11/1965 | Hettinger | 301/37.25 |
| 3,722,958 A | * | 3/1973 | Marshall | 301/37.25 |
| 5,290,094 A | * | 3/1994 | Gragg | 301/37.25 |
| 5,490,342 A | * | 2/1996 | Rutterman et al. | 40/587 |
| 5,588,715 A | * | 12/1996 | Harlen | 301/37.25 |
| 6,554,370 B2 | * | 4/2003 | Fowlkes | 301/37.25 |

* cited by examiner

Primary Examiner—S. Joseph Morano
Assistant Examiner—Jason R. Bellinger
(74) Attorney, Agent, or Firm—Bacon & Thomas, PLLC

(57) ABSTRACT

A wheel cover. The wheel cover includes engraved holes with special shapes on a circular disc of the wheel cover, latch members on the backside of the wheel cover, and the latch members define a diameter of an area on the wheel cover for embedding the steel wheel. A turning disc is disposed on the wheel cover. An axle is disposed on the axle and pivotally coupled to a bearing on the wheel cover. A wing plate is defined on the turning disc, and the wing plate rotates independently from the wheel cover when the vehicle is moving.

5 Claims, 3 Drawing Sheets

WHEEL COVER HAVING ROTATING WING PLATE

BACKGROUND OF THE INVENTION

1. Field of the Invention

This invention relates to a wheel cover having rotating wing plates, which produces a rotating effect while a vehicle is moving or coming to a stop.

2. Description of the Related Art

The use of wheel covers for vehicles is very popular. In FIG. 1, a traditional wheel 1 cover is basically comprised of a circular disc 11; a plurality of engraved holes 12 in special shapes disposed on the circular disc 11; a plurality of latch members 13, each latch member at its end has a groove 14, such that the grooves 14 of the latch members 13 define an area for surrounding and supporting a steel ring 15, and the external periphery of the area defined by the latch members 15 propped by the steel ring 15 is embedded into the steel wheel 2.

The U.S. Pat. No. 5,490,342 entitled on-rotating wheel cover disclosed a wheel cover having a turning disc with weights, so that the weights cause the wheel cover not to rotate as the wheels of a motor vehicle rotate and the motor vehicle is in motion. In other words, the turning disc remains still, so that the index on the turning disc can be read.

The U.S. Pat. No. 5,588,715 entitled on-rotating wheel cover assembly disclosed a wheel cover, which is suspended and not fixed onto the steel ring of the tire. By means of the weights installed around the periphery of the wheel cover, the rotating wheel cover is kept still while the vehicle is moving. Therefore, the pattern and shape on the surface of the wheel cover can be seen clearly while the tire is rotating.

Both of the two cited patents use an axle to let the wheel rotate or make the wheel cover or the turning disc not to rotate after the circular disc of the wheel cover rotates by installing weights on the wheel cover or the turning disc. Different wheel covers have different stylistic functions; for example, the wheel cover as shown in FIG. 1 is completely fixed onto the steel wheel of the tire and does not rotate, and no index will be observed on the wheel cover when the vehicle is moving. As mentioned in the two cited U.S. Pat. Nos. 5,490,342 and 5,588,715, both use bearing for the rotation, or even use weights to keep the wheel cover or the disc still, but the effects and implications so produced are different.

SUMMARY OF THE INVENTION

The primary objective of this invention is to provide an improved wheel cover having rotating wings, which comprises a circular disc; a plurality of engraved holes of various shapes disposed on the circular disc; a plurality of latch members, each at its end has a groove, such that the grooves of the latch members define an area for surrounding and supporting a steel ring, and the external periphery of the area defined by the latch members propped by the steel ring is embedded into the steel ring; a turning disc disposed on the wheel cover, an axle disposed on the turning disc is pivotally coupled to a bearing on the wheel cover; the turning disc forms a wing plate which can rotate the steel ring and the wheel cover while the vehicle is moving.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
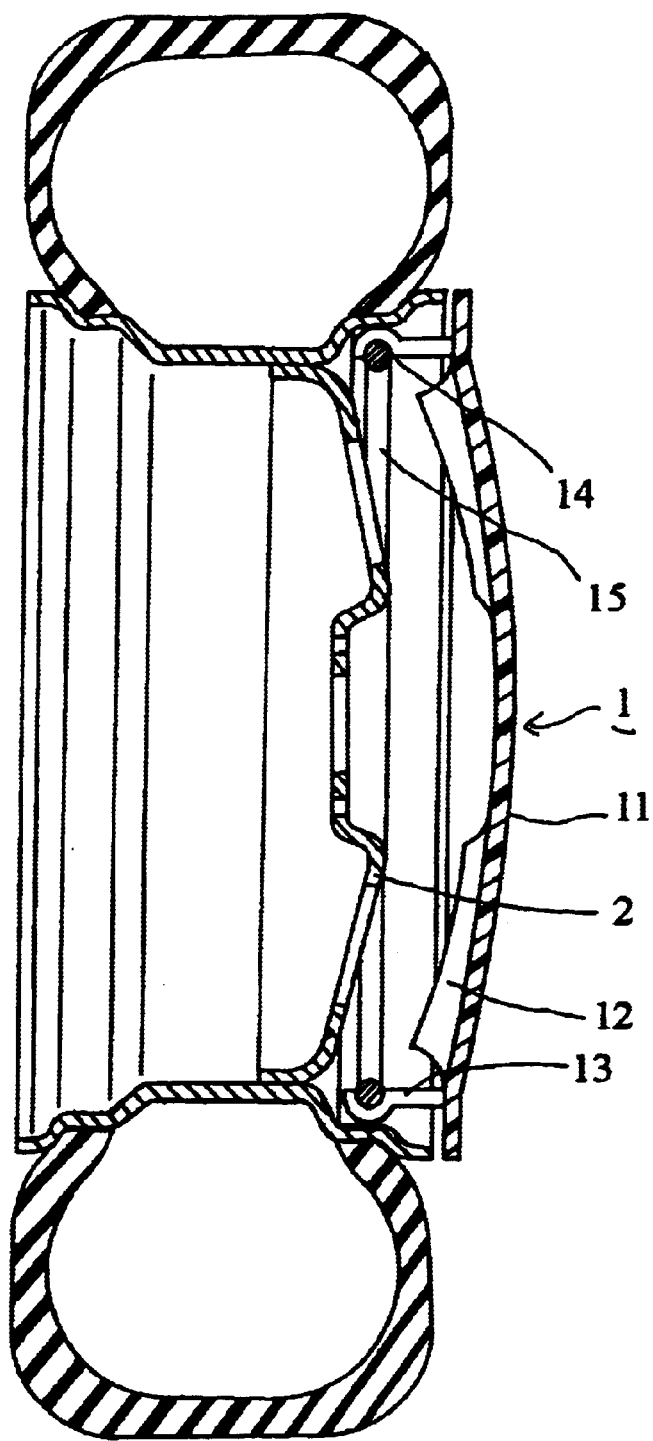
FIG. 1 is a cross-sectional diagram of a prior art wheel cover being embedded into a steel ring of the tire.

In the detailed description of the preferred embodiments, it should be noted that like elements are indicated by the same reference numerals throughout the disclosure.

Figure 2:
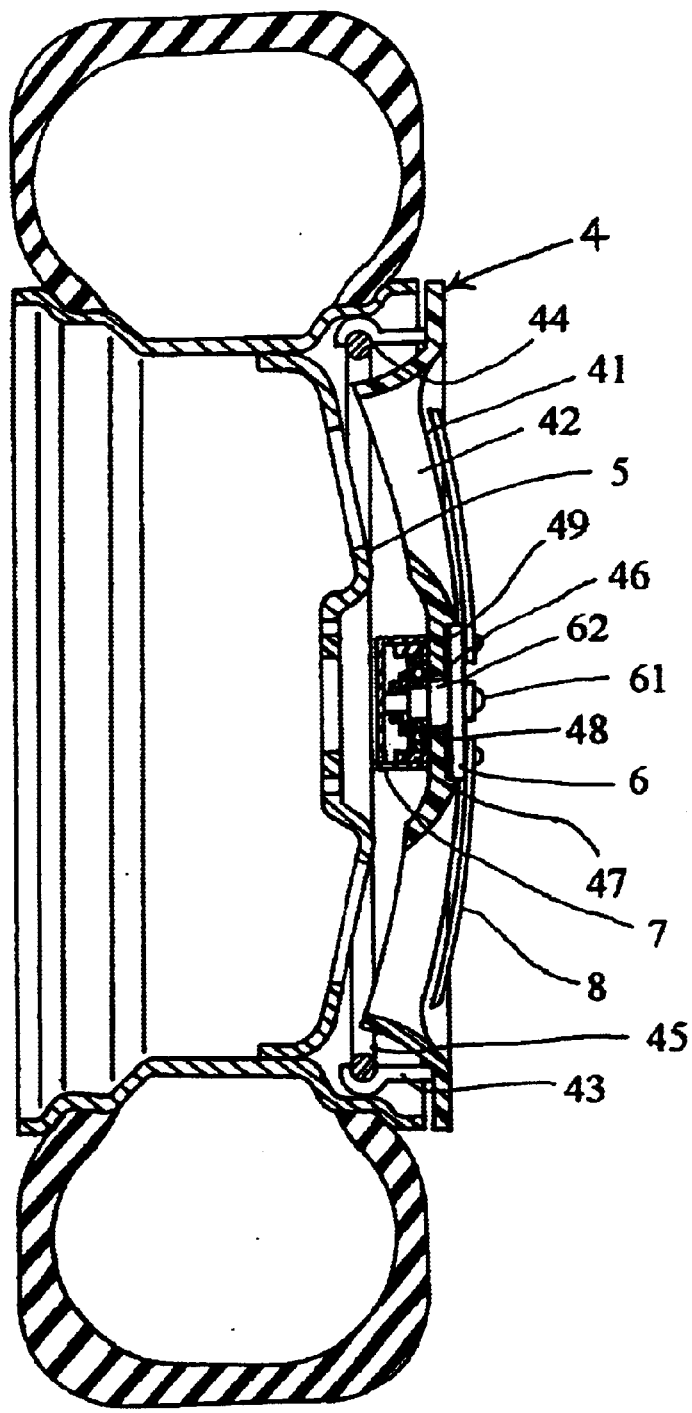
FIG. 2 is an illustrative diagram of the backside of a retaining base of a preferred embodiment of the present invention.
Figure 3:
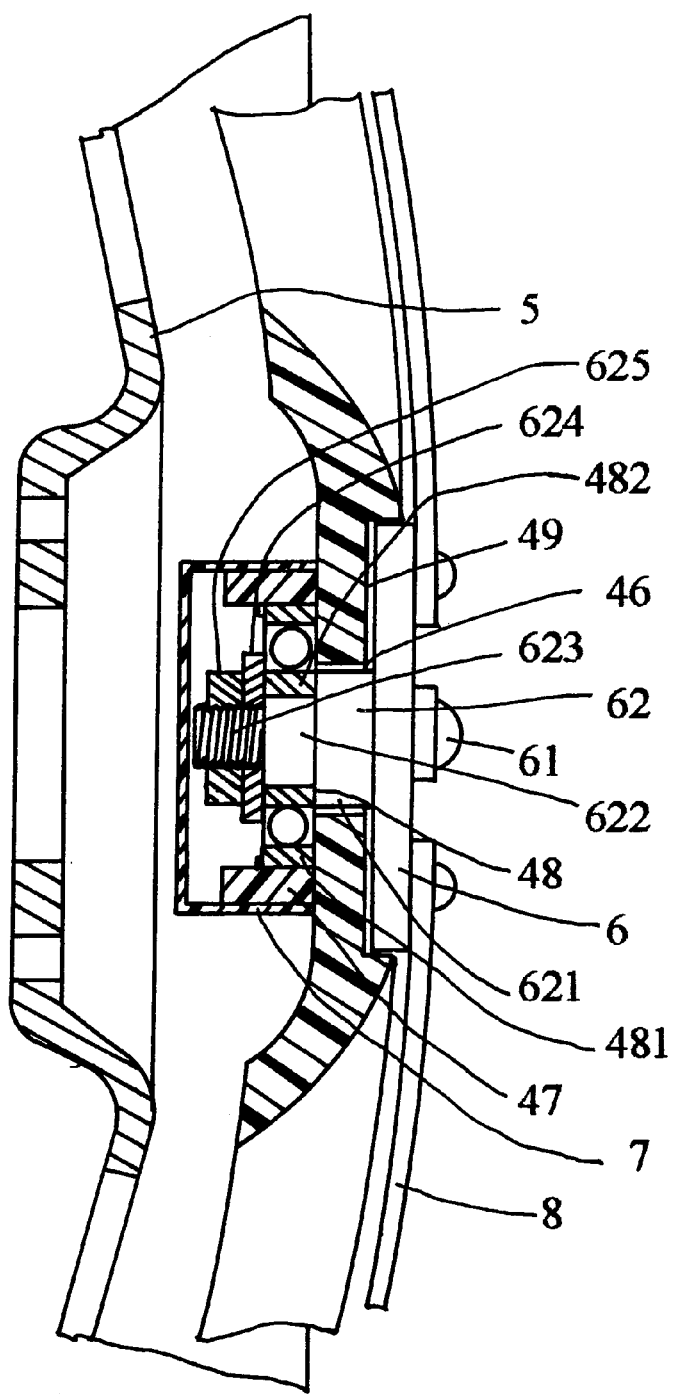
FIG. 3 is a cross-sectional diagram of an enlarged section of FIG. 2.

Please refer to FIG. 2 and FIG. 3 for a wheel cover 4 of a preferred embodiment of the present invention, which comprises a circular disc 41; a plurality of engraved holes 42 with special shapes disposed on the circular disc 41; a plurality of latch members 43 equidistantly disposed on the backside of the wheel cover 4, each latch member 43 at its end having a groove 44, and the grooves 44 of the latch members 43 define an area for enclosing and supporting a steel ring 45, and the external periphery of the area defined by the latch members 43 propped by the steel ring 45 is embedded into the steel wheel 5; the wheel cover 4 further comprises an axle hole 46 at its center and a fixed base 47 on the backside of the wheel cover 4; a bearing is disposed in the fixed base 47 such that an external axle ring 481 of the bearing 48 is fixed and positioned onto the fixed base 47; a turning disc 6 is mounted onto an axle 62 disposed on a side of the turning disc 6 by a screw member 61, and the axle has three diameters at three different sections, the diameter of the first section 621 is disposed in the axle hole 46 of the wheel cover 4 and a gap is formed between the internal axle ring 482 and the turning disc 62 for the rotation; the diameter of the second section 622 is slightly smaller than the diameter of the first section 621 and is disposed in the internal axle ring 482 in the bearing 48, and linked to the internal axle ring 482; the diameter of the third section 623 forms a thread and is fixed onto the bearing 48 by screw nut 625 after coupling to the washer 624; a cover 7 is disposed on the outside of the bearing 48 to prevent dust from entering into and affecting the operation of the bearing 48; the turning disc 6 is disposed on a concave area 49 on the wheel cover 4, but the upper surface of the turning disc 6 is slightly higher than the upper surface of the wheel cover 4. A plurality of wing plates 8 is fixed by screws on the turning disc 6 equidistantly around the upper surface of the turning disc 6, each wing plate 8 can be placed horizontally or tilted with an angle, or placed horizontally but bent towards the periphery of the wheel cover 4; the plurality of wing plates 8 can be substituted by a circular disc structure.

When the vehicle is moving and the steel wheel 5 of the tire is rotating, the wheel cover 4 also rotates accordingly because it is fixed onto the steel wheel 5. Then the wheel cover 4 is rotated in clockwise direction due to the effect of the airflow on the wing plates 8, such that the wing plates will rotate in the counterclockwise direction with respect to the wheel cover 4. Even when the vehicle comes to a stop, the airflow or wind of the external environment also blows the wing plates 8 and produces the rotation.

In view of the above description, the wheel cover of the preferred embodiment of the present invention comprises a plurality of rotating wing plates, and the rotation of the wing plates provides a lively movement to the wheel cover, and keeps a certain gap between the turning disc at the upper section of the wheel cover and the wheel cover. The turning disc is a rotating wing plate or a disc member by itself, which can independently rotate while the vehicle is moving. The wheel cover no longer is a boring and independent component fixed onto the wheel of the tire.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A wheel cover having rotating wing plates, comprising:
a circular disc;
a plurality of holes disposed in the circular disc;
a plurality of latch members on the backside of the wheel cover;
said latch members defining an area with an external diameter for attaching to a steel wheel;
a turning disc disposed on the wheel cover;
an axle disposed on the turning disc and pivotally coupled to a bearing on the wheel cover;
the wing plates are disposed on the turning disc, the wing plates rotate independently of the wheel cover;
an axle hole;
a fixed base disposed on the backside of the wheel cover, and said bearing is disposed in the fixed base; and
an external axle ring of the bearing is fixed onto the fixed base.

2. A wheel cover having rotating wing plates, comprising:
a circular disc;
a plurality of holes disposed in the circular disc;
a plurality of latch members on the backside of the wheel cover;
said latch members defining an area with an external diameter for attaching to a steel wheel;
a turning disc disposed on the wheel cover;
an axle disposed on the turning disc and pivotally coupled to a bearing on the wheel cover;
the wing plates are disposed on the turning disc, the wing plates rotate independently of the wheel cover; and
said turning disc is disposed in a concave area on the wheel cover, and the outer surface of the turning disc is spaced axially outward from the outer surface of the wheel cover.

3. A wheel cover having rotating wing plates, comprising:
a circular disc;
a plurality of holes disposed in the circular disc;
a plurality of latch members on the backside of the wheel cover;
said latch members defining an area with an external diameter for attaching to a steel wheel;
a turning disc disposed on the wheel cover;
an axle disposed on the turning disc and pivotally coupled to a bearing on the wheel cover;
at least one of the wing plates is disposed on the turning disc, and the wing plates rotate independently of the wheel cover;
an axle hole;
a fixed base disposed on the backside of the wheel cover, and said bearing is disposed in the fixed base; and
an external axle ring of the bearing is fixed onto the fixed base.

4. A wheel cover having rotating wing plates, comprising:
a circular disc;
a plurality of holes disposed in the circular disc;
a plurality of latch members on the backside of the wheel cover;
said latch members defining an area with an external diameter for attaching to a steel wheel;
a turning disc disposed on the wheel cover;
an axle disposed on the turning disc and pivotally coupled to a bearing on the wheel cover;
at least one of the wing plates is disposed on the turning disc, and the wing plates rotate independently of the wheel cover; and
said turning disc is disposed in a concave area on the wheel cover, and the outer surface of the turning disc is spaced axially outward from the outer surface of the wheel cover.

5. A wheel cover having rotating wing plates, comprising:
a circular disc;
a plurality of holes disposed in the circular disc;
a plurality of latch members on the backside of the wheel cover;
said latch members defining an area with an external diameter for attaching to a steel wheel;
a turning disc disposed on the wheel cover;
an axle disposed on the turning disc and pivotally coupled to a bearing on the wheel cover;
the turning disc is disposed on the wheel cover keeping a certain gap from the wheel cover, the wing plates rotate independently of the wheel cover;
an axle hole;
a fixed base disposed on the backside of the wheel cover, and said bearing is disposed in the fixed base; and
an external axle ring of the bearing is fixed onto the fixed base.

* * * * *